M. W. & J. T. OBENCHAIN.
Devices for Preventing Back Motion of Shafts.

No. 152,247.  Patented June 23, 1874.

WITNESSES.
W. J. Murphy
Wm. Hale

INVENTORS.
M. W. Obenchain
J. T. Obenchain
per F. A. Lehmann, Atty

UNITED STATES PATENT OFFICE.

MATTHEW W. OBENCHAIN AND JOHN T. OBENCHAIN, OF LOGANSPORT, INDIANA.

IMPROVEMENT IN DEVICES FOR PREVENTING BACK MOTION OF SHAFTS.

Specification forming part of Letters Patent No. 152,247, dated June 23, 1874; application filed December 26, 1873.

*To all whom it may concern:*

Be it known that we MATTHEW W. OBENCHAIN and JOHN T. OBENCHAIN, of Logansport, in the county of Cass and State of Indiana, have invented certain new and useful Improvements in Attachments to Water-Wheels; and we do hereby declare the following to be a full, clear, and exact description of the invention, such as will enable others skilled in the art to which it pertains to make and use it, reference being had to the accompanying drawings, which form part of this specification.

The nature of our invention relates to an improved device to be attached to the shafts so as to prevent any back action in case the wheel should be suddenly checked in its revolutions by any obstructions in the water; and it consists in a frame having a number of pivoted spring arms or pawls, which catch behind projections formed in the cover, and turn the machinery with the wheel, but should the wheel be suddenly stopped they slip idly around, and allow the machinery to move on until it loses its momentum.

Figure 1:
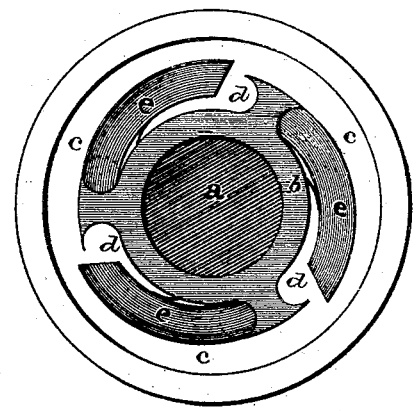
Figure 2:
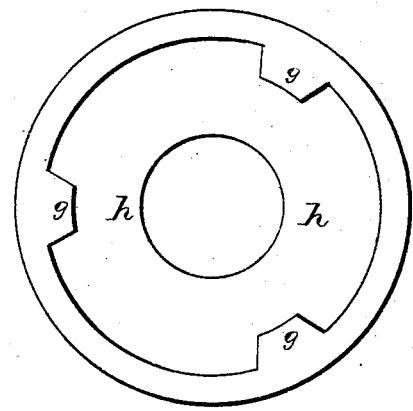
Figure 3:
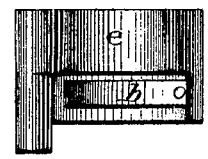

Figure 1 represents a plan view of the device attached to the shaft of a water-wheel. Fig. 2 is an inverted view of the cover alone. Fig. 3 is a side elevation of one of the pawls.

$a$ represents the shaft of a water-wheel, to which the frame $c$ is secured in any suitable manner. Pivoted in the circular recesses $d$, formed in the sides of the raised portion of the frame, are a number of curved pawls or arms, $e$, which are held pressed outward at one end by the springs $b$. The outer ends of these arms catch behind the projections $g$ formed around the inner surface of the cover $h$, and turn it around with the shaft, and thus operate the machinery attached thereto. Should any obstruction in the water suddenly check the revolution of the wheel these pawls slip idly around, and allow the machinery to move on until it loses its momentum.

Having thus described our invention, we claim—

An attachment to the shafts consisting of the frame $c$, arms or pawls $e$, springs $b$, and cover $h$, having the projections $g$, substantially as shown and described.

In testimony that we claim the foregoing we have hereunto set our hands this 20th day of December, 1873.

MATTHEW W. OBENCHAIN.
  JOHN T. OBENCHAIN.

Witnesses:
 F. A. LEHMANN,
 W. W. J. MURPHY.